Oct. 7, 1958     J. C. McCLARAN     2,854,705
PORTABLE HUNTING BLIND
Filed July 25, 1956     3 Sheets-Sheet 2
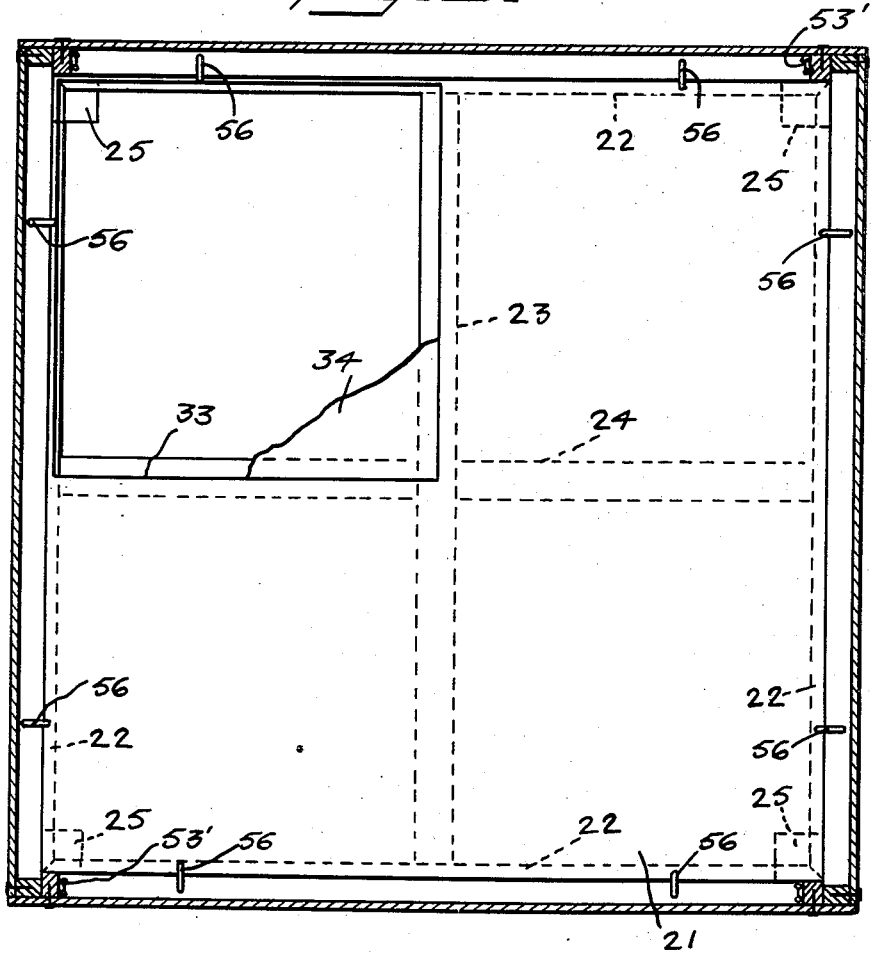
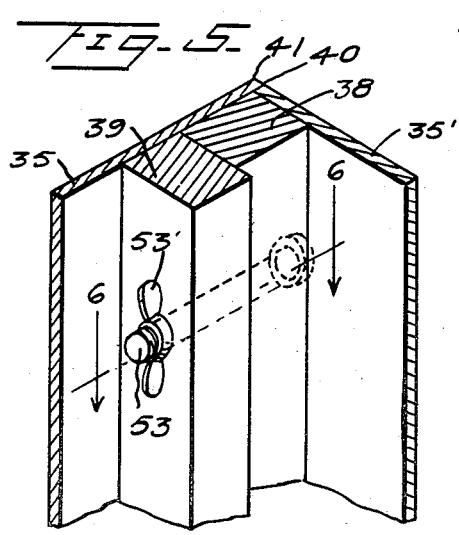
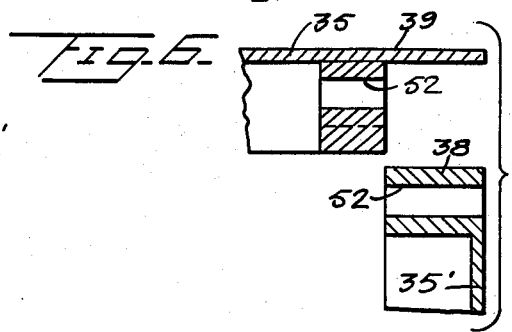
INVENTOR
J.C. McClaran
BY Kimmel & Crowell
ATTORNEYS

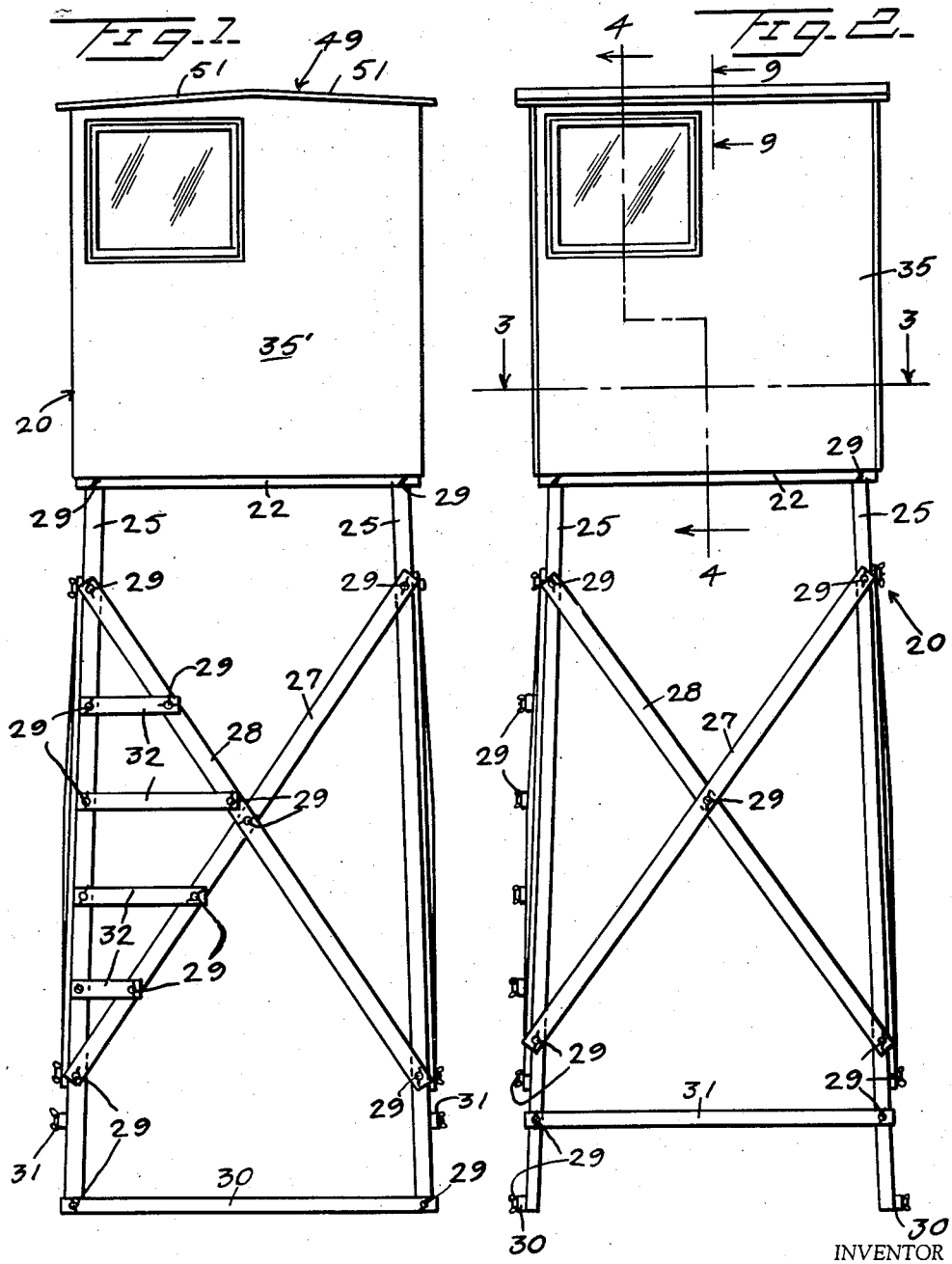

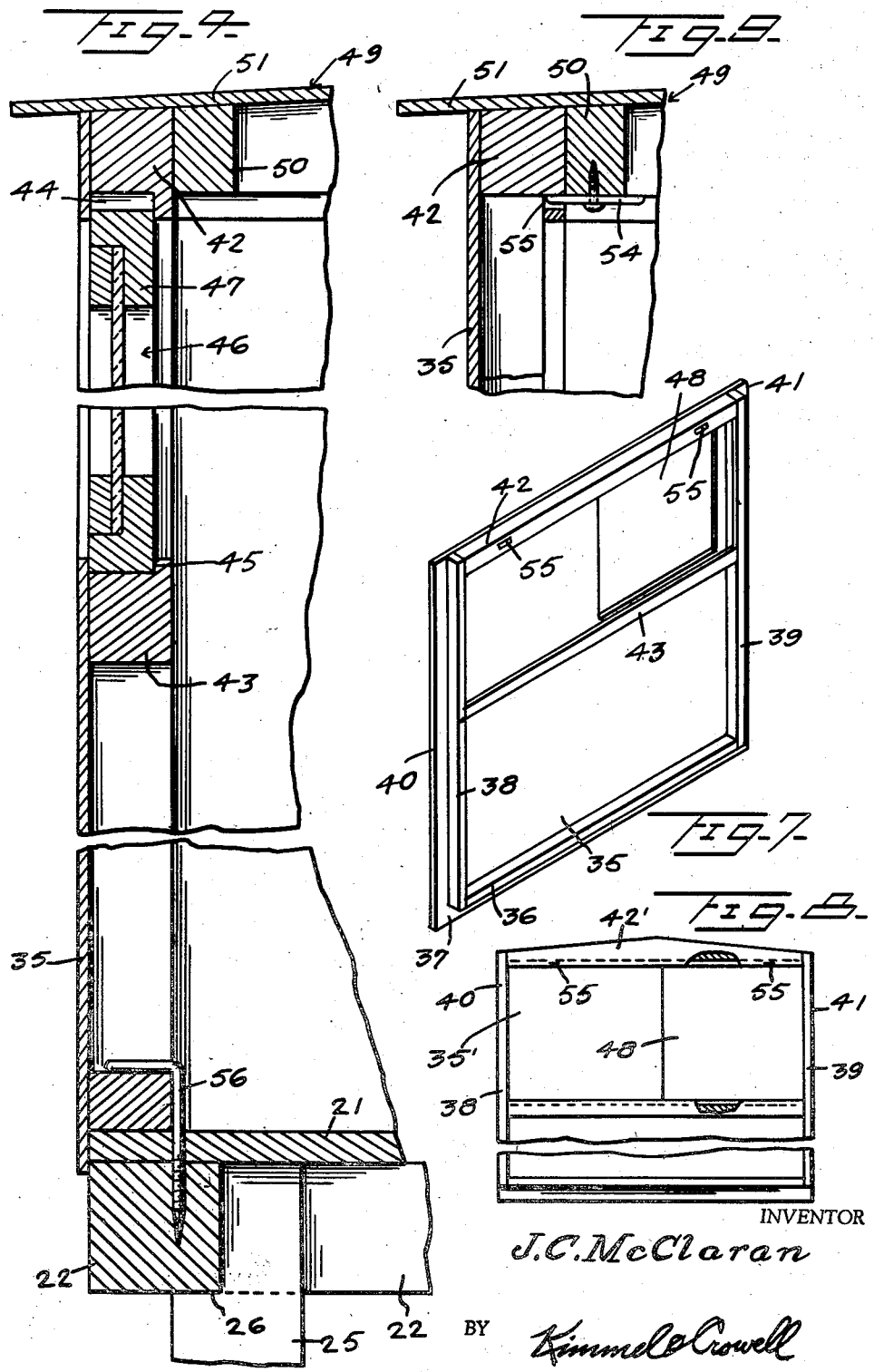

United States Patent Office 2,854,705
Patented Oct. 7, 1958

2,854,705

PORTABLE HUNTING BLIND

Johnson C. McClaran, Houston, Tex.

Application July 25, 1956, Serial No. 600,099

1 Claim. (Cl. 20—2)

The present invention relates to portable hunting blinds, and more particularly to such devices which can be readily carried on the average car to and from the hunting site.

The primary object of the invention is to provide a hunting blind which can be erected and collapsed without the use of tools and which will provide complete cover for the hunter while enabling him to shoot in any direction.

Another object of the invention is to provide a portable hunting blind which is elevated above the normal ground level enabling the hunter to command a greater area.

A further object of the invention is to provide a portable hunting blind of the class described above having shooting windows therein which can be opened for shooting and ventilation and closed when desired to eliminate cold air.

A still further object of the invention is to provide a portable hunting blind of the class described above which is inexpensive to manufacture, simple to erect and collapse and which can be carried without requiring special equipment.

Other objects and advantages will become apparent in the following specification when considered in the light of the attached drawings, in which:

Figure 1 is a side elevation of the invention.

Figure 2 is a side elevation of the invention showing the side adjacent the side illustrated in Figure 1.

Figure 3 is an enlarged horizontal cross-section taken along the line 3—3 of Figure 2, looking in the direction of the arrows.

Figure 4 is an enlarged fragmentary vertical cross-section taken along the line 4—4 of Figure 2, looking in the direction of the arrows.

Figure 5 is an enlarged fragmentary perspective view illustrating the panel fasteners.

Figure 6 is an exploded horizontal cross-section taken along the line 6—6 of Figure 5, looking in the direction of the arrows.

Figure 7 is a perspective view of the interior side of one of the side panels.

Figure 8 is a fragmentary internal side elevation of another of the panels forming the side of the invention.

Figure 9 is an enlarged fragmentary vertical cross-section taken along the line 9—9 of Figure 2, looking in the direction of the arrows.

Referring now to the drawings in detail wherein like reference characters indicate like parts throughout the several figures, the reference numeral 20 indicates generally a portable hunting blind constructed in accordance with the invention.

The hunting blind 20 comprises a base panel or floor 21 having frame members 22 forming a rectangular framework supporting its outer edges and a pair of crossed frame members 23 and 24 extending from medial points of opposite side frame members 22. The floor 21 is supported on a plurality of detachably connected legs 25 with one leg 25 extending downwardly from each corner of the floor 21. Each of the legs 25 is rabbeted as at 26 to permit the leg 25 to engage the inside end and bottom of each of the frame members 22, as best illustrated in Figure 4.

Adjacent legs 25 are connected by X-shaped bracing members 27 and 28 which are secured to the legs 25 by means of bolt and wing nut fastening members 29. The brace 27 is secured to the brace 28 at their intersection by means of a wing nut and bolt combination 29. One of the nut and bolt combinations 29 on one pair of braces 27 and 28 as well as the pair opposite thereto are centered with relation to the leg 25 and with relation to the braces 27 and 28 so that when the lower ends of the braces 27 and 28 are disconnected from the legs 25, the braces 27 and 28 will align with the leg 25 to which it is attached by the upper bolt and wing nut combination 29.

In the case, however, of the braces 27 and 28 on the other opposed pair of sides, the wing nut and bolt combination 29 is offset with relation to the braces 27 and 28 to permit the braces 27 and 28 to overlie the braces 27 and 28 swung inwardly from the adjacent side. Cross connectors 30 extend from the lower end of the adjacent legs 25 and are secured thereto by wing nut and bolt combinations 29 on opposite sides of the hunting blind 20, while connector members 31 are positioned above the lower end of the legs 25 to extend between the adjacent sides of the blind 20, as seen in Figures 1 and 2.

One side of the blind 20 is provided with a plurality of ladder rung forming cross members 32 each secured to one of the legs 25 at one end and one of the braces 27, 28 at the other end by means of wing nut and bolt combinations 29.

The floor 21 is provided with an opening 33 to provide access for the blind 20. A trap door 34 is adapted to engage the frame members 22, 23 and 24 to fill the opening 33 in the floor 21 after the hunter has entered the blind 20. A pair of generally rectangular identical side walls 35 are positioned on opposite sides of the floor 21 and extend upwardly therefrom.

Each of the side walls 35 is provided with a bottom frame member 36 spaced from the bottom edge 37 of the wall 35, and a pair of upright frame members 38 and 39 spaced inwardly from the side edges 40 and 41, respectively, of the side wall 35.

A top frame member 42 extends between the upper ends of the side frame members 38 and 39 and is positioned at the top of the side wall 35. A transverse cross frame member 43 is positioned in parallel relation to the frame member 42 and extends between the frame members 38 and 39 in vertically spaced relation to the frame member 42. The frame member 42 is provided with a rabbet 44 and the frame member 43 is provided with a rabbet 45 both extending longitudinally thereacross.

A window, generally indicated at 46, is provided with a frame 47 which is adapted to engage in the rabbets 44 and 45 so as to slidably engage therein permitting the opening 48 in the side wall 35 to be closed by sliding the window 46 thereover. The other sides of the blind 20 have opposed side walls 35' which are identical in every respect to the side wall 35, with the exception that the top frame member 42' slopes upwardly to a center point, for reasons to be assigned.

A roof panel, generally indicated at 49, is provided with frame members 50 which are adapted to engage within the confines of the frame members 42, 42' of the side walls 35, 35', as illustrated in Figure 4, and has secured thereto roof panels 51.

The frame members 38 and 39 of the side wall 35' are positioned adjacent the edges 40 and 41 of the side panel 35' so that the side frames 38 and 39 of the side wall 35 can fit therebetween. Each of the side frames 38 and 39 of each of the side walls 35 are provided with vertically spaced bores 52 which are axially aligned, as best shown in Figure 6, and have a bolt 53 extending therethrough secured by a wing nut 53'.

The frame members 50 of the roof panel 49 are each provided with button clips 54 each pivotally mounted on a screw 54'. Each clip 54 is adapted to engage in a groove 55 formed in the upper frame members 42, 42' of the side panels 35, 35'. The floor 21 is provided with a plurality of angle hooks 56 which are adapted to engage over the bottom frame members 36 of the side panels 35, 35' to secure the side walls 35, 35' to the floor panel 21.

It can readily be seen that by the use of the wing nut bolt combinations 29, 53, 53', the clips 54 and hooks 56 that the blind can be readily assembled and disassembled without the use of tools so that a hunter going into the hunting area with the blind would be burdened only with the weight of the blind and the hunting equipment carried therealong.

It is also quite evident that with a window positioned in each of the side walls 35, 35' that the hunter who is within the blind 20 can command every direction and can fire at game in any direction he desires merely by opening the window 46 on the correct side of the blind 20. It should be understood, of course, that the window opening 48 can be arranged to suit left handed hunters was necessary.

Having thus described the preferred embodiment of the invention, it should be understood that numerous other structural modifications and adaptations may be resorted to without departing from the scope of the appended claim.

What is claimed is:

A portable hunting blind comprising a plurality of elongated upright legs arranged in a generally rectangular relationship and sloping inwardly slightly, a horizontal floor panel detachably secured to the upper ends of said legs, X-bracing extending between adjacent legs on each side of said blind, a unitary side wall panel detachably secured to each of the side edges of said floor panel and extending upwardly therefrom, means detachably securing the abutting edges of each of said side wall panels together, a unitary roof panel resting on the upper edges of said side wall panels and detachably secured thereto, a sliding window arranged for horizontal movement in each of said side wall panels adjacent one side edge thereof, and a trap door formed in said horizontal floor panel for access to said hunting blind.

References Cited in the file of this patent

UNITED STATES PATENTS

| | | |
|---|---|---|
| 1,075,368 | Miller | Oct. 14, 1913 |
| 1,662,086 | Brown | Mar. 22, 1927 |
| 1,676,272 | McEwen | July 10, 1928 |
| 2,765,500 | Campus | Oct. 9, 1956 |